United States Patent
Iida et al.

(10) Patent No.: US 11,750,283 B2
(45) Date of Patent: Sep. 5, 2023

(54) OPTICAL FIBER ROUTE SEARCH METHOD, OPTICAL FIBER ROUTE SEARCH DEVICE AND PROGRAM

(71) Applicant: NIPPON TELEGRAPH AND TELEPHONE CORPORATION, Tokyo (JP)

(72) Inventors: Daisuke Iida, Musashino (JP); Nazuki Honda, Musashino (JP); Tatsuya Okamoto, Musashino (JP); Yoshifumi Wakisaka, Musashino (JP); Hiroyuki Oshida, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 73 days.

(21) Appl. No.: 17/427,651

(22) PCT Filed: Jan. 17, 2020

(86) PCT No.: PCT/JP2020/001425
§ 371 (c)(1),
(2) Date: Aug. 1, 2021

(87) PCT Pub. No.: WO2020/158438
PCT Pub. Date: Aug. 6, 2020

(65) Prior Publication Data
US 2022/0103252 A1  Mar. 31, 2022

(30) Foreign Application Priority Data
Feb. 1, 2019 (JP) ................. 2019-017425

(51) Int. Cl.
*H04B 10/27* (2013.01)
*H04B 10/071* (2013.01)
*H04B 10/2507* (2013.01)

(52) U.S. Cl.
CPC ....... *H04B 10/071* (2013.01); *H04B 10/2507* (2013.01); *H04B 10/27* (2013.01)

(58) Field of Classification Search
CPC ... H04B 10/071; H04B 10/2507; H04B 10/27
See application file for complete search history.

(56) References Cited

U.S. PATENT DOCUMENTS

2008/0151231 A1\* 6/2008 Peterson, Jr. ........ H04B 10/071
356/73.1
2011/0311218 A1  12/2011 Nakajima et al.
(Continued)

OTHER PUBLICATIONS

D. Iida, et al., "Distributed measurement of acoustic vibration location with frequency multiplexed phase-OTDR," Optical Fiber Technol., vol. 36, pp. 19-25, 2017.

*Primary Examiner* — Dzung D Tran
(74) *Attorney, Agent, or Firm* — Harness, Dickey & Pierce, P.L.C.

(57) ABSTRACT

An object is to provide an optical fiber route search method, an optical fiber route search device, and a program that can efficiently confirm a path of an optical fiber that is installed over a long distance or across a large range. The optical fiber route search method according to the present invention carries out optical measurement that performs distributed measurement of the state of an optical fiber while applying a disturbance to the optical fiber in a portion in which wires of the optical fiber are parallel to each other, branch out, or intersect with each other (a proximity portion), and determines that the position in which the number of singularities (peaks or intensity fluctuations) fluctuates (becomes plural) is the position of the proximity portion from a distribution diagram obtained through the optical measurement.

7 Claims, 9 Drawing Sheets

(A)

(B)

(56) References Cited

U.S. PATENT DOCUMENTS

| | | | |
|---|---|---|---|
| 2012/0134663 A1* | 5/2012 | Wang | H04B 10/272 356/73.1 |
| 2013/0038879 A1* | 2/2013 | Dorize | G01M 11/3127 356/445 |
| 2014/0212130 A1* | 7/2014 | Urban | H04B 10/0771 398/13 |
| 2020/0249075 A1* | 8/2020 | Ma | G02B 26/04 |

* cited by examiner

OPTICAL FIBER ROUTE SEARCH METHOD, OPTICAL FIBER ROUTE SEARCH DEVICE AND PROGRAM

CROSS-REFERENCE TO RELATED APPLICATIONS

This application is a 371 U.S. National Phase of International Application No. PCT/JP2020/001425 filed on Jan. 17, 2020, which claims priority to Japanese Application No. 2019-017425 filed on Feb. 1, 2019. The entire disclosures of the above applications are incorporated herein by reference.

TECHNICAL FIELD

The present disclosure relates to an optical fiber route search method, an optical fiber route search device, and a program that search for a path taken by an optical fiber.

BACKGROUND ART

Optical fibers are used as, for example, sensors in optical sensing technology, rather than as communication media, and are installed in various places. Especially, in view of optical fiber sensors which are not accompanied by branching via optical couplers and the like (power division) and which do not use devices other than optical fibers, optical fibers are similarly installed in the form of wires and cables both in the case of optical fibers for communication and in the case of optical fiber sensors.

As the biggest feature of an optical fiber is low-loss, long-distance optical transmission, wiring extends over a long distance on the order of kilometers both in the case of communication and in the case of a sensor. Furthermore, in both usages, wiring is done in various forms including branches, loops, turn-arounds, and the like so as to lay the optical fiber across a large area.

In the following description, branching of an optical fiber via an optical coupler and the like is referred to as "power division", and branching of a wiring route of an optical fiber or a cable is referred to as "branching", so as to distinguish them from each other.

In maintenance and sensing of such an optical fiber installed across a large range on the order of kilometers, a measurement technique that uses Optical Time Domain Reflectometry (OTDR) is widely used. Furthermore, there is also, for example, Optical Frequency Domain Reflectometry (OFDR) as high-resolution measurement. In both of them, light is made incident from one end of an optical fiber, and the state of the optical fiber is measured using reflected light thereof. In addition, there is also a measurement from both ends, such as an optical interferometer and Brillouin Optical Time Domain Analysis (BOTDA) that uses Brillouin scattered light. A measurement that uses Brillouin scattered light also includes Brillouin Optical Time Domain Reflectometry (BOTDR) that performs measurement at one end. Besides these, there are techniques that perform distributed measurement of various states of an optical fiber.

Furthermore, according to these techniques, such physical states as the temperature, distortion, and vibration of an optical fiber can also be measured in addition to optical loss. Measuring these various parameters using various measurement methods enables maintenance and sensing of an optical fiber that is installed broadly on the order of kilometers. NPL 1 indicates an example of vibration measurement that uses OTDR.

CITATION LIST

Non Patent Literature

[NPL 1] D. Iida, et al., "Distributed measurement of acoustic vibration location with frequency multiplexed phase-OTDR," Optical Fiber Technol., vol. 36, pp. 19-25, 2017

SUMMARY OF THE INVENTION

Technical Problem

An optical fiber that is installed broadly on the order of kilometers in the foregoing manner does not permanently remain the same in terms of the state of wiring thereof, and there are always changes in the area of wiring and a target object. For example, in the case of an optical fiber for communication, the wiring and configuration are changed frequently at the discretion of a user. Furthermore, in sensing as well, a target facility thereof can be changed or moved. At the time of such changes, it is necessary to appropriately manage changes in a wiring route and pass-through points (facilities) of optical fiber wiring; however, for various reasons, a failure to correct data of the wiring route and a failure to acknowledge the changed state of an intermediate portion due to management of only both ends of an optical fiber can readily occur.

In order to accurately acknowledge a wiring route of an optical fiber, a task of confirming the optical fiber from one end is required. During this task, for example, in a place that cannot be visually observed (e.g., an underground pipe line in the case of an optical fiber for communication, and the inside of a structure in the case of sensing), the existence of the optical fiber can be confirmed by applying a disturbance in this portion with the application of optical sensing. The optical fiber in the place that cannot be visually observed is influenced by, for example, hitting the optical fiber or changing a temperature; in this way, the existence of the optical fiber can be confirmed with the use of optical sensing.

However, both a communication optical fiber and a sensing optical fiber are often installed so as to extend in length on the order of kilometers. In this case, making a confirmation from one end of an optical fiber is not only extremely inefficient, but also even impossible for other reasons. That is to say, a problem with a task of inspecting an optical fiber is that there is no efficient method of confirming a path of an optical fiber that is installed over a long distance or across a large range.

With the foregoing problem in view, it is an object of the present invention to provide an optical fiber route search method, an optical fiber route search device and a program that can efficiently confirm a path of an optical fiber that is installed over a long distance or across a large range.

Means for Solving the Problem

To achieve the foregoing object, an optical fiber route search method according to the present invention carries out optical measurement that performs distributed measurement of the state of an optical fiber while applying a disturbance to the optical fiber in a portion in which wires of the optical fiber are parallel to each other, branch out, or intersect with each other (a proximity portion), and determines that the position in which the number of singularities (peaks or intensity fluctuations) fluctuates (becomes plural) is the position of the proximity portion from a distribution diagram obtained through the optical measurement.

Specifically, an optical fiber route search method according to the present invention is an optical fiber route search method that confirms a path of one optical fiber that is arranged in a space so as to include at least one proximity portion in which the optical fiber is in proximity to itself, the optical fiber route search method including: performing optical measurement of inputting test light to the optical fiber while applying a disturbance to an arbitrary section of the optical fiber, and obtaining a distribution of response light of the test light in a length direction of the optical fiber; performing a singularity detection step of detecting a change in the number of singularities that appear in the distribution of the response light based on a position of the optical fiber in which the disturbance has been applied; and performing a determination step of determining that the proximity portion exists in the position of the optical fiber in which the disturbance has been applied when the number of the singularities has changed, and estimating an arrangement of the optical fiber connecting to the proximity portion.

Furthermore, an optical fiber route search device according to the present invention is an optical fiber route search device that confirms a path of one optical fiber that is arranged in a space so as to include at least one proximity portion in which the optical fiber is in proximity to itself, the optical fiber route search device including: a measured data input unit that input a distribution of response light of the test light in a length direction of the optical fiber, the distribution of response light is obtained by inputting test light to the optical fiber while applying a disturbance to an arbitrary section of the optical fiber; and a measurement result analysis unit that detects the number of singularities that appear in the distribution of the response light input to the measured data input unit, determines that the proximity portion exists in a position of the optical fiber in which the disturbance has been applied when detecting a change in the number of the singularities due to a change in a position of application of the disturbance, and estimates a status of an arrangement of the optical fiber connecting to the proximity portion.

In a case where one optical fiber is arranged in a space, if a disturbance was applied to an area in which only one optical fiber is arranged, only one singularity appears in a distribution diagram obtained through the optical measurement. However, if a disturbance was applied to an area in which the optical fiber is, for example, turned around and thus a plurality of optical fibers are arranged (a proximity portion), a plurality of singularities appear in the distribution diagram obtained through the optical measurement. That is to say, when a plurality of singularities appear in the distribution diagram obtained through the optical measurement, it can be determined that a plurality of optical fibers exist in the position in which the disturbance is applied. Furthermore, the arrangement of the optical fiber can be estimated from a position relationship among the singularities in the distribution diagram.

Therefore, the present invention can provide the optical fiber route search method and the optical fiber route search device that can efficiently confirm a path of an optical fiber that is installed over a long distance or across a large range.

The optical fiber route search method according to the present invention executes the optical measurement to the determination are performed in a vicinity of a position of the proximity portion stored in a database, and further includes: performing a calibration of comparing the position of the proximity portion or an arrangement of the optical fiber determined in the determination with the position of the proximity portion or an arrangement of the optical fiber stored in the database, and calibrating the position of the proximity portion or the arrangement of the optical fiber stored in the database.

The optical fiber route search device according to the present invention further includes: a wiring list input unit that is input a position of the proximity portion or an arrangement of the optical fiber stored in a database; and an calibrating unit that compares the position of the proximity portion or the arrangement of the optical fiber input to the wiring list input unit with the position of the proximity portion determined by the measurement result analysis unit or the arrangement of the optical fiber estimated by the measurement result analysis unit, and calibrates the position of the proximity portion or the arrangement of the optical fiber input to the wiring list input unit.

Also, the optical fiber route search device according to the present invention may further include a measurement position presentation unit that presents the position of applied the disturbance based on the position of the proximity portion or the arrangement of the optical fiber input to the wiring list input unit.

The arrangement of the optical fiber estimated from the distribution diagram obtained through the optical measurement is compared with the arrangement of the optical fiber stored in the database, and if there is a difference therebetween, the arrangement of the optical fiber stored in the database is corrected; in this way, a change in the arrangement of the optical fiber can be reflected in the database.

The optical fiber route search method according to the present invention executes the singularity detection and the determination are performed in sequence, from one end of the optical fiber on which the test light is input in the optical measurement toward a direction away from the one end.

When there is no database related to the arrangement of the optical fiber, the arrangement of the optical fiber can be predicted to a certain extent by applying a disturbance from an end portion of the optical fiber on which the test light is made incident during the optical measurement, moving the position of application of the disturbance gradually to a far end side, and acknowledging the fluctuation in the number of singularities that appear in the distribution diagram obtained through the optical measurement and the distances between the singularities. That is to say, in the present invention, there is no need to perform the optical measurement by applying the disturbance throughout the entire area in which the optical fiber is arranged in order to find out the arrangement of the optical fiber.

The present invention is a program for causing a computer to function as the aforementioned optical fiber route search device. The optical fiber route search device according to the present invention can be realized also by the computer and the program, and can both record the program into a recording medium and provide the program via a network.

Effects of the Invention

The present invention can provide an optical fiber route search method, an optical fiber route search device, and a program that can efficiently confirm a path of an optical fiber that is installed over a long distance or across a large range.

DESCRIPTION OF EMBODIMENTS

Embodiments of the present invention will be described with reference to the attached drawings. The embodiments described below are working examples of the present invention, and the present invention is not limited to the following embodiments. Note, it is assumed that constituent elements that have the same reference sign in the present specification and the drawings are identical to each other.

(Definitions)

A basic task of confirming a path of an optical fiber is to repeat a task of applying a disturbance to the optical fiber, whether remotely or directly, and specifying the position in which the disturbance was applied by detecting the disturbance with use of a technique capable of performing distributed measurement of the disturbance from one end or both ends of the optical fiber. This task of establishing the position of the existence of the optical fiber is referred to as "confirmation of the optical fiber".

Furthermore, in performing distributed measurement of the state of the optical fiber, the positions of both two end portions of the optical fiber on which light is made incident are acknowledged. Note that in the case of one-end measurement, only the position of one end portion may be acknowledged. As the direction from one end portion to the other end portion of the optical fiber is known, "the direction of the optical fiber" denotes the direction from one end portion A to the other end portion B in the case of both-end measurement, and denotes the direction from an end portion on which light is made incident to a far end in the case of one-end measurement.

Furthermore, it is assumed that an optical fiber whose route is to be established is one optical fiber which has only two opposite ends and for which there is no optical power division on an optical transmission line, and is a wire that can be drawn in a single line.

Figure 5:
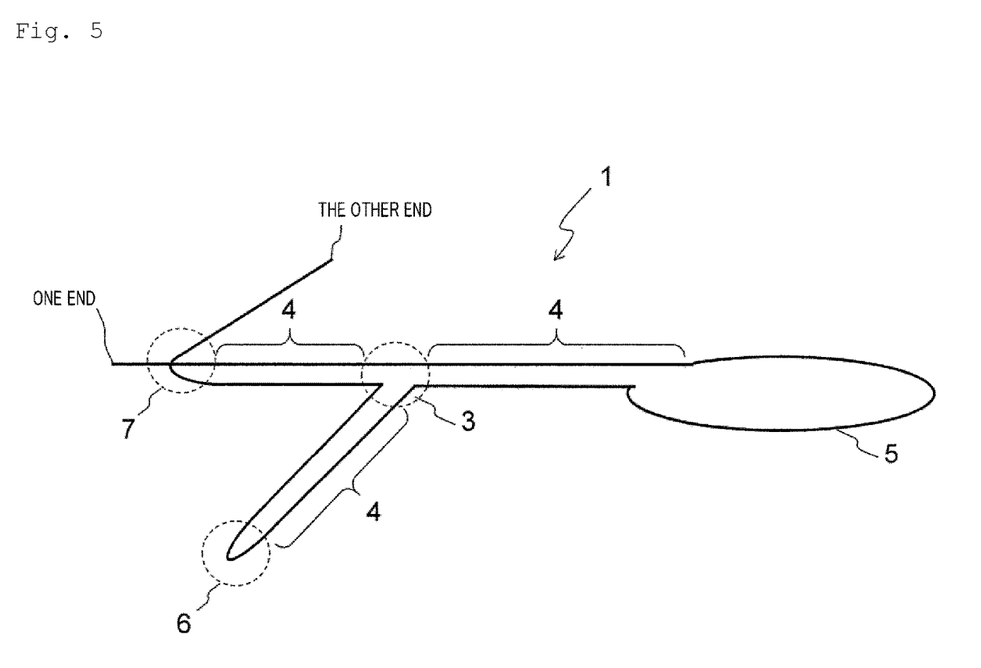
FIG. 5 is a diagram illustrating the definition of a proximity portion.

FIG. 5 is a diagram illustrating an example of wiring of one optical fiber arranged in a space. A portion 4 in which a plurality of optical fibers are adjacent to each other is referred to as a "parallel portion". A portion 6 in which the direction of light is inverted as viewed from the space is referred to as a "turn-around portion". A portion 5 in which light travels along an outer periphery of a certain region as viewed from the space is referred to as a "loop portion". A portion 3 in which one optical fiber moves away from the other optical fiber at an arbitrary point in the parallel portions 4 and then returns to the arbitrary point again as viewed from the space is referred to as a "branch portion". A portion 7 in which one optical fiber intersects with the other optical fiber is referred to as an "intersection portion".

Also, the parallel portions 4, the branch portion 3, and the intersection portion 7 are collectively referred to as a "proximity portion".

First Embodiment

Figure 7:
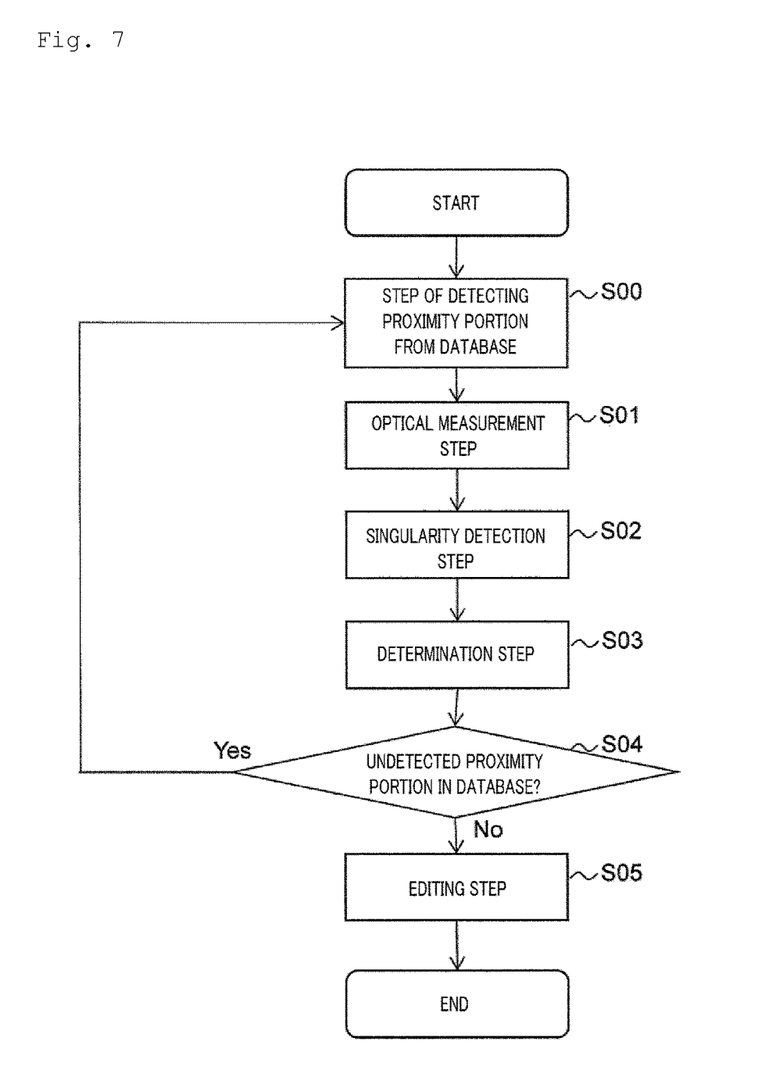
FIG. 7 is a diagram illustrating the optical fiber route search method according to the present invention.

FIG. 7 is a flowchart illustrating an optical fiber route search method according to the present embodiment. The present optical fiber route search method is a fiber route search method of confirming a path of one optical fiber 1 that is arranged in a space so as to include at least one proximity portion in which the optical fiber 1 is in proximity to itself.

The present optical fiber route search method executes an optical measurement step S01, a singularity detection step S02, and a determination step S03. The optical measurement step S01 makes test light incident on the optical fiber 1 while applying a disturbance to an arbitrary section of the optical fiber 1, and obtains the distribution of response light of the test light in the length direction of the optical fiber 1.

The singularity detection step S02 detects a change in the number of singularities that appear in the distribution of the response light based on the position of the optical fiber 1 in which the disturbance was applied.

The determination step S03 determines that the proximity portion exists in the position of the optical fiber 1 in which the disturbance was applied when the number of the singularities has changed, and also estimates the arrangement of the optical fiber 1 connecting to the proximity portion.

Figure 1:
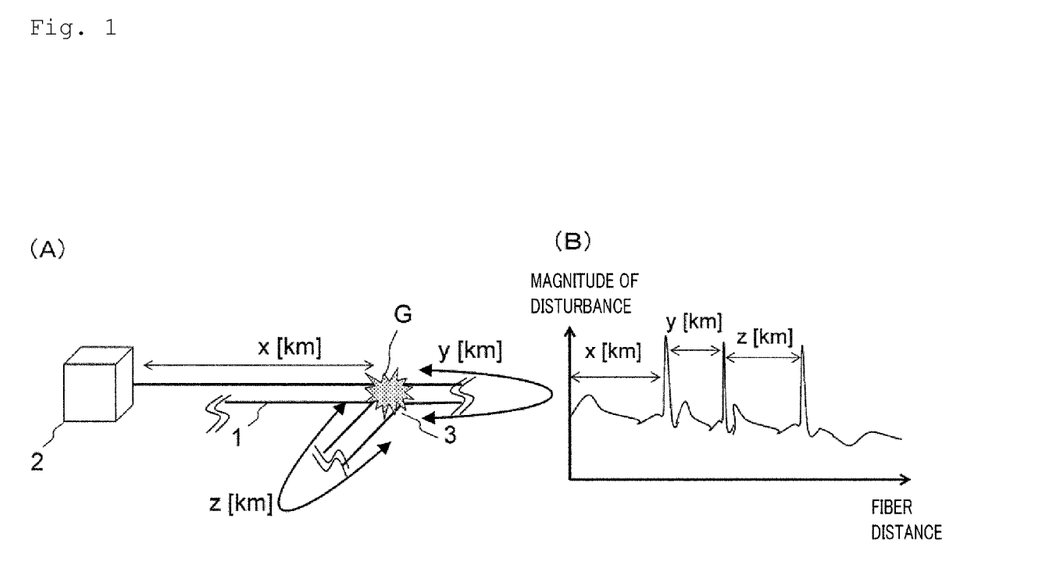
FIG. 1 is a diagram illustrating an optical fiber route search method according to the present invention.

For example, assume that wiring of the optical fiber 1 is as shown in FIG. 1(A). In this wiring, a parallel portion 4 and a branch portion 3 exist. Assume that two portions of the optical fiber 1 are parallel to each other in the parallel portion 4. In this case, the parallel optical fibers are in a status where, for example, the parallel optical fibers are included in one cable or exist in the form of optical fiber cables that take the same route.

A disturbance G is applied to the wiring shown in FIG. 1(A), and optical measurement is performed using test light that is made incident from one end portion of the optical fiber 1. In an optical test, the intensity of response light (e.g., backscattered light) relative to the test light is measured, and the intensity distribution of the response light in the distance direction of the optical fiber is obtained. Here, in the case of application to the branch portion 3, three singularities appear in the intensity distribution as shown in a graph of FIG. 1(B). In this graph, a horizontal axis represents the optical fiber position, and a vertical axis represents the magnitude of the disturbance; for example, a waveform thereof can be measured by measuring backscattered light and the like attributed to a pulse that is made incident at one end, as in OTDR and the like, for confirmation of the optical fiber. As stated earlier, an optical measurement device 2 that performs optical measurement may be any device as long as the measurement can obtain the distribution of the states inside the optical fiber, as with OTDR, OFDR, Brillouin OTDR (OTDA), an interferometer, and so forth. Although the singularities are peaks in the graph of FIG. 1(B), the singularities may be, for example, attenuation. Furthermore, regarding the type of the test light, such as power, frequency, and polarization, no limitation is intended.

The distances between the three peaks in the intensity distribution make it possible to acknowledge the length over which the optical fiber 1 extends from the section (branch portion 3) in which the disturbance was applied, is arranged in other areas, and then returns.

Figure 2:
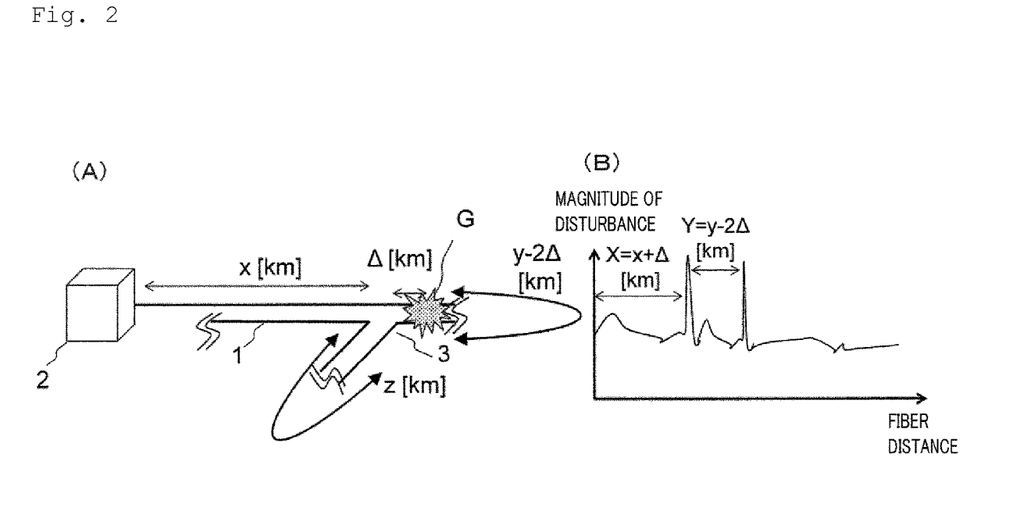
FIG. 2 is a diagram illustrating the optical fiber route search method according to the present invention.

FIG. 2 is a diagram illustrating a state where the position of application of the disturbance has been changed in the wiring of the optical fiber 1 in FIG. 1. When optical measurement is performed with a small shift from the branch portion 3 as shown in FIG. 2(A), the number and the positions of singularities in the intensity distribution change as shown in FIG. 2(B). The change in the position in which the disturbance was applied and the change in the number and the positions of singularities make it possible to acknowledge the arrangement direction of the optical fiber 1 and the arranged state of the optical fiber 1, that is to say, whether the optical fiber 1 is in a branch portion, a parallel portion, an intersection portion, or a stand-alone state.

Figure 3:
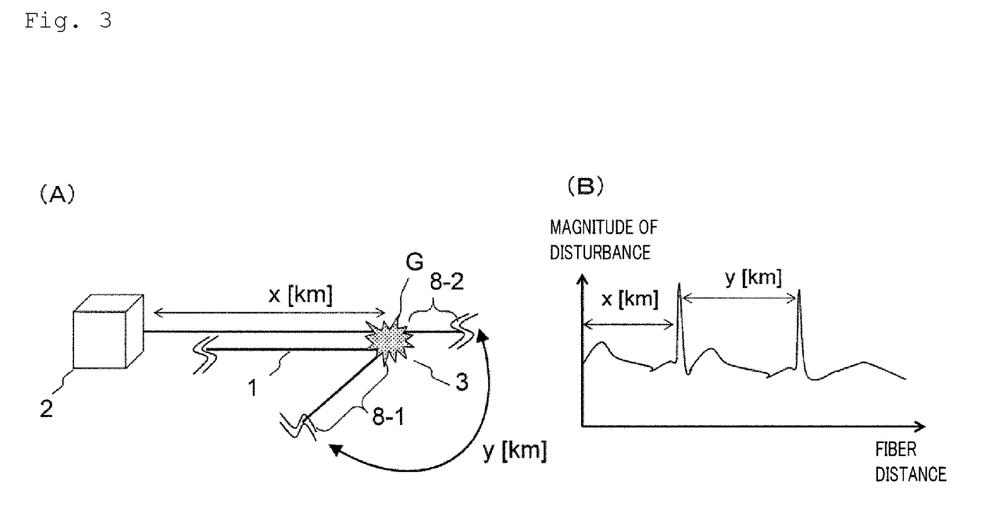
FIG. 3 is a diagram illustrating the optical fiber route search method according to the present invention.

Furthermore, assume that wiring of the optical fiber 1 is as shown in FIG. 3(A). In this wiring, a parallel portion 4, a branch portion 3, and stand-alone portions (8-1, 8-2) exist. The stand-alone portion 8-1 and the stand-alone portion 8-2 are connected as in the loop portion 5 illustrated in FIG. 5. The intensity distribution shown in FIG. 3(B) is obtained by performing optical measurement with application of the disturbance G to the branch portion 3 of the optical fiber arrangement in FIG. 3(A). In this case, two singularities appear. The present wiring similarly makes it possible to acknowledge the wiring length of the optical fiber 1 based on the distances between singularities, and also establishes the direction in which the optical fiber 1 is arranged by shifting the position of the disturbance G. Furthermore, after the position of the disturbance G has been shifted, it can be determined that this direction is a parallel portion if the number of singularities remains two, and that this direction is a stand-alone portion (loop portion) in which the optical fiber 1 stands alone if the number of singularities becomes one. That is to say, with respect to the branch portion 3, the number of optical fibers 1 that are arranged in respective directions can be confirmed.

As described above, by performing an optical fiber confirmation task with use of a disturbance in a proximity portion or in the vicinity thereof, the following can be acknowledged from the changes in the number and the positions of singularities in the intensity distribution.

Figure 4:
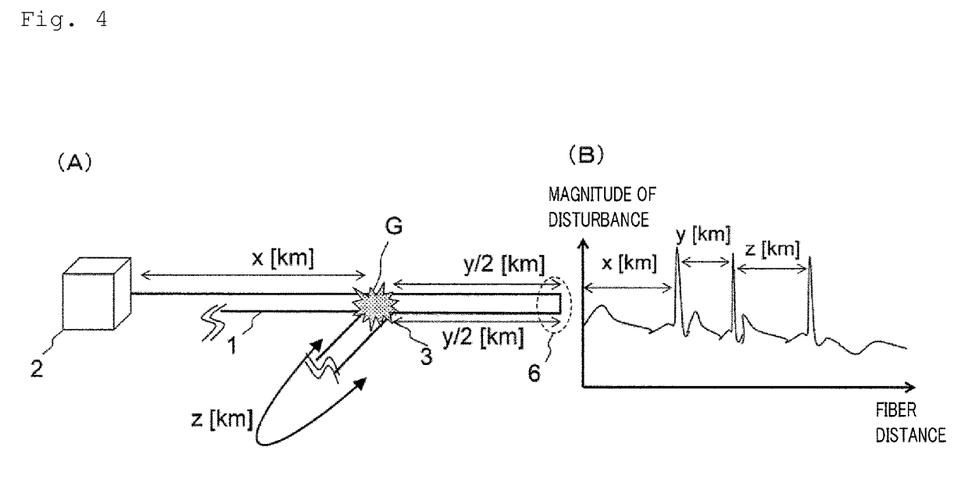
FIG. 4 is a diagram illustrating the optical fiber route search method according to the present invention.

1. A relationship between the optical fiber and the proximity portion (the direction in which the optical fiber connects to the proximity portion)
2. The distance between the proximity portion and the optical measurement device
3. The number of portions in which optical fibers are parallel to each other and which connect to the proximity portion Furthermore, when it is known that a parallel portion 4 exists, a turn-around point 6 at which the optical fiber 1 turns around can also be acknowledged based on the distances between singularities in the intensity distribution as shown in FIG. 4.

Note that although the present embodiment has described a branch portion 3 that includes two branches as a proximity portion, the number of branches may be two or more, the proximity portion may be the intersection portion 7 illustrated in FIG. 5, or the number of intersections may be three or more. By implementing the present optical fiber route search method with respect to such a proximity portion, all of the number of branches, the distance, the directions, and the number of optical fibers can be acknowledged.

Second Embodiment

In the present embodiment, a description is given of the execution of a step of confirming the difference between the arrangement of an optical fiber stored in a database and the arrangement of an optical fiber set in a real space. As stated earlier, the arrangement of an optical fiber may change from an initial state. It is thus necessary to periodically implement an optical fiber route search method according to the present embodiment and correct the arrangement of an optical fiber in a database.

Figure 8:
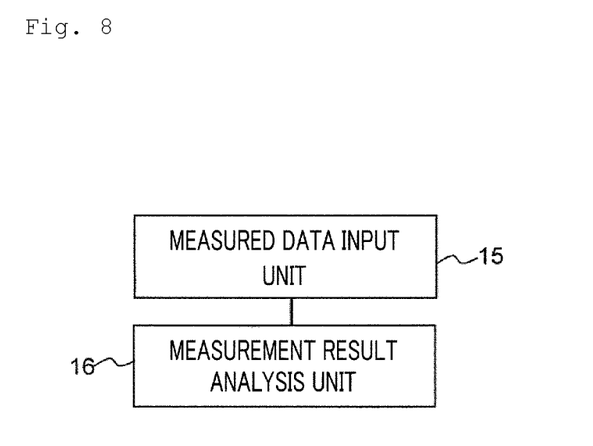
FIG. 8 is a diagram illustrating an optical fiber route search device according to the present invention.

FIG. 8 is a flowchart illustrating the present optical fiber route search method. A feature of the present optical fiber route search method is to, with the application of the optical fiber route search method illustrated in FIG. 6, execute the optical measurement step S01 to the determination step S03 in the vicinity of the position of the proximity portion stored in a database. At this time, if there are more than one proximity portions, the optical measurement step S01 to the determination step S03 are executed for each proximity portion (steps S00 and S04).

A further feature of the present optical fiber route search method is to compare the position of the proximity portion or the arrangement of the optical fiber 1 determined in the determination step S03 with the position of the proximity portion or the arrangement of the optical fiber 1 stored in the database, and execute an editing step S05 of editing the position of the proximity portion or the arrangement of the optical fiber 1 stored in the database.

When the state stored in the database and the state detected by the present optical fiber route search method do not match in terms of the number and the directions of optical fibers connecting to the proximity portion, the following determination is made.

For example, when the number of optical fibers connecting to a branch portion is larger than the number in the database, it means that the number of branches is larger than the number of branches stored in the database. Thus, by confirming the surroundings of this branch portion, the arrangement of optical fibers in unacknowledged directions can be discovered. Specifically, even when the database stores the arrangement of the optical fiber shown in FIG. 1(A), if there are four singularities in the intensity distribution obtained through the actual optical measurement, it means that the optical fiber passes through this branch portion 3 four times. That is to say, it can be confirmed that the optical fiber is arranged also in a different direction that has not been acknowledged, and the number of branches at a branch point is larger than three. An indication of a new branch direction that is not stored in the database is given by the on-site status of this branch portion 3.

Third Embodiment

The present embodiment will be described in relation to a case where the arrangement of an optical fiber is not stored in a database. A feature of an optical fiber route search method according to the present embodiment is to execute the optical measurement step S01 to the determination step S03 in sequence, from one end of the optical fiber 1 on which the test light is made incident to the other end in the space.

Figure 6:
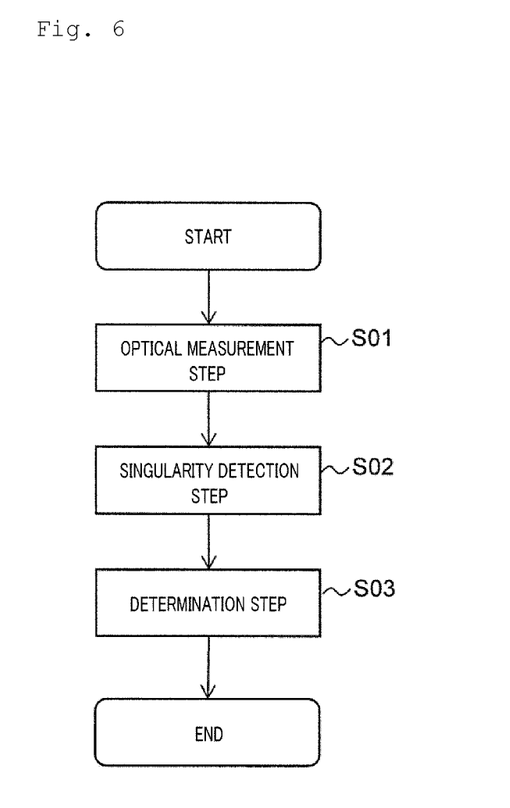
FIG. 6 is a diagram illustrating the optical fiber route search method according to the present invention.

When the arrangement of the optical fiber is not stored in the database, in an initial stage, it is necessary to execute the optical measurement step S03 to the determination step S03 illustrated in FIG. 6 from one end of the optical fiber 1 (an end connected to the optical measurement device 2) in the direction toward the other end while changing the position in which the disturbance is applied. If a proximity portion is found while changing the position in which the disturbance is applied, the arrangement of the optical fiber is estimated thereafter as described in the first embodiment. That is to say, although it is necessary to confirm the optical fiber in the initial stage as in conventional cases, the wiring route of the optical fiber can be confirmed efficiently from halfway.

(Advantageous Effects of First to Third Embodiments)

With this task, the directions, the distance, and the number of optical fibers can be confirmed at all of branch/intersection points that can be acknowledged in optical fiber wiring to be measured. Placing these points on a diagram makes it possible to confirm the directions, the number, and the distance of optical fibers extending to areas that do not match data and unknown areas, and establish a detailed optical fiber route.

When the aforementioned task is not performed, it is necessary to confirm an entire range from one end of an optical fiber, which is an enormous amount of task because the optical fiber range extends on the order of kilometers. However, with the aforementioned optical fiber confirmation task that uses a plurality of reactions, a route of an optical fiber in a complicated range can be efficiently established.

As stated earlier, the present invention is to efficiently confirm a wiring route by establishing a point in which a disturbance appears as a plurality of points simultaneously. That is to say, the present invention has no advantageous effects when one optical fiber is installed with no intersection or loop. For example, the present invention is based on the premise that there is a loop as in the case of an optical fiber for maintenance of a communication line and the like, or that wiring includes an intersection, a turn-around, and/or a loop so that the wiring covers a large area as in the case of sensing and the like.

Fourth Embodiment

In the present embodiment, data is added to a database that manages optical fiber communication facilities so that the positions of manholes can be managed based on the optical fiber length from a communication building. In the present embodiment, manholes correspond to branch portions and intersection portions in a database. In the present embodiment, a disturbance is applied in a proximity portion located at a manhole. The present embodiment makes it possible to establish the number of branches, the directions, the distance, and the number of optical fibers from a change in the number of singularities in the intensity distribution in a manner similar to the description of the first embodiment. By performing this task at each manhole, a route can be established simply by confirming an optical fiber that extends as long as several tens of kilometers at a plurality of points.

Fifth Embodiment

FIG. 8 depicts an optical fiber route search device according to the present embodiment, which can automatically realize the optical fiber route search method described in the first embodiment (FIG. 6). The present optical fiber route search device is an optical fiber route search device that confirms a path of one optical fiber that is arranged in a space so as to include at least one proximity portion in which the optical fiber is in proximity to itself.

The present optical fiber route search device includes a measured data input unit 15 and a measurement result analysis unit 16. The measured data input unit 15 makes test light incident on the optical fiber while applying a disturbance to an arbitrary section of the optical fiber, and receives as an input the distribution of response light of the test light in the length direction of the optical fiber.

The measurement result analysis unit 16 detects the number of singularities that appear in the distribution of the response light input to the measured data input unit 15, determines that the proximity portion exists in the position of the optical fiber in which the disturbance was applied when detecting a change in the number of the singularities due to a change in the position of application of the disturbance, and also estimates the status of the arrangement of the optical fiber connecting to the proximity portion.

Specifically, the measured data input unit 15 receives as an input the distribution of the response light obtained as a result of the execution of the optical measurement step S01 of FIG. 6 by the optical measurement device 2 of FIG. 1. The measurement result analysis unit 16 executes the singularity detection step S02 and the determination step S03 of FIG. 6. Therefore, the present optical fiber route search device makes it possible to acknowledge the arrangement of the optical fiber described in the First Embodiment.

Sixth Embodiment

Figure 9:
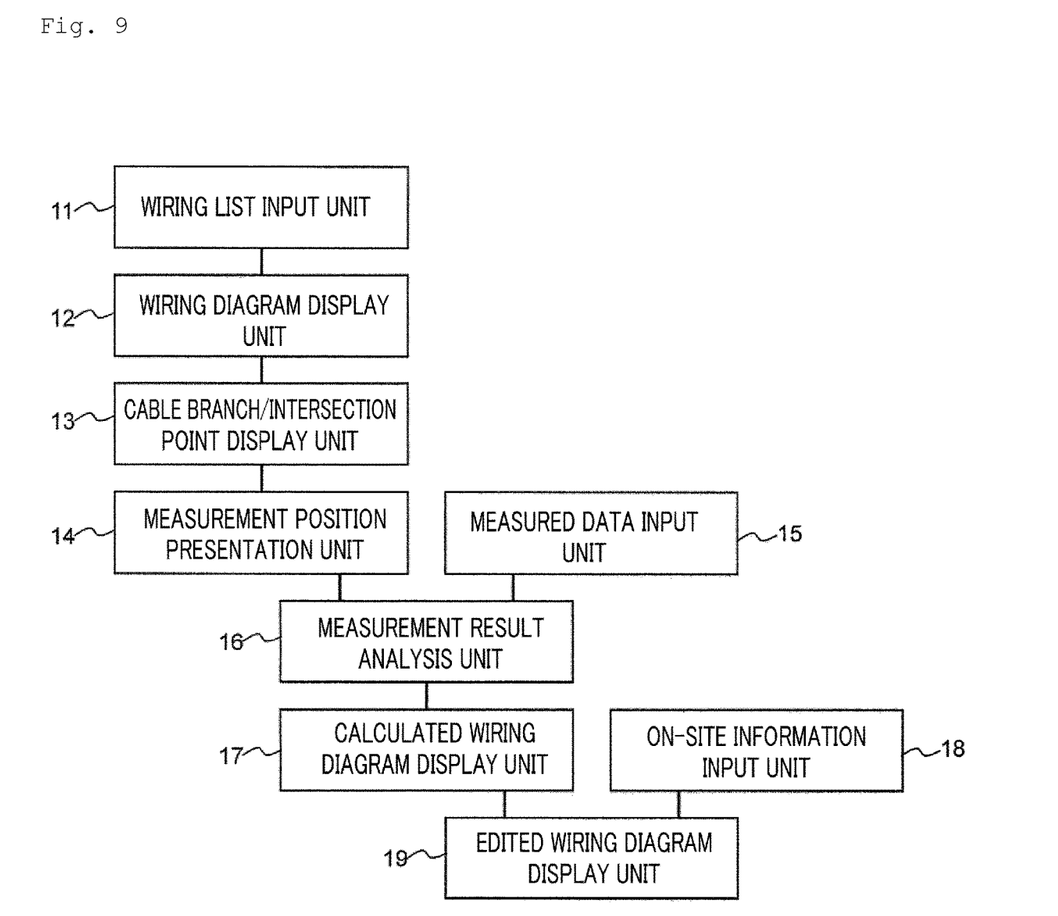
FIG. 9 is a diagram illustrating the optical fiber route search device according to the present invention.

FIG. 9 depicts an optical fiber route search device according to the present embodiment, which can automatically realize the optical fiber route search methods described in the second and the third embodiments (FIG. 6 and FIG. 7). The present optical fiber route search device further includes a wiring list input unit 11 and an editing unit 19 in addition to the components of the optical fiber route search device described in the fifth embodiment.

The wiring list input unit 11 receives as an input the position of the proximity portion or the arrangement of the optical fiber stored in a database.

The editing unit 19 compares the position of the proximity portion or the arrangement of the optical fiber input to the wiring list input unit 11 with the position of the proximity portion determined by the measurement result analysis unit 16 or the arrangement of the optical fiber estimated by the measurement result analysis unit 16, and edits the position of the proximity portion or the arrangement of the optical fiber input to the wiring list input unit 11.

The present optical fiber route search device may further include a measurement position presentation unit 14 that presents the position of application of the disturbance based on the position of the proximity portion or the arrangement of the optical fiber input to the wiring list input unit 11.

The present optical fiber route search device can construct a system for confirming, establishing, and editing a route of wiring of an optical fiber that extends on the order of kilometers by automatically calculating, for example, the distance, the directions, and the number of optical fibers in the wiring. This procedure will be described.

Procedure 1

Known wiring data of an optical fiber is input from a database to the wiring list input unit 11. For example, a list of the names and the positions of the points through which the optical fiber passes, or the distances thereto, is input. Also, in the case of underground wiring, a list of the names and the positions of facilities through which a cable passes, such as manholes, is used.

Procedure 2

A wiring diagram display unit 12 and a cable branch/intersection point display unit 13 extract proximity portions by, for example, generating a diagram of the input wiring data. Here, on this diagram, the proximity portions may be explicitly shown as the positions in which the measurement position presentation unit 14 applies a disturbance.

Procedure 3

The distribution of response light that has been obtained by performing optical measurement while applying the disturbance to the proximity portions is input to the measured data input unit 15.

Procedure 4

From the distribution of the response light, the measurement result analysis unit 16 estimates, for example, the number of branches, the number of intersections, the directions, and the distance in the proximity portions, as well as the number of parallel optical fibers therein.

Procedure 5

From the result of estimation by the measurement result analysis unit 16, a calculated wiring diagram display unit 17 establishes a path along which the optical fiber is arranged by arranging the proximity portions on an optical fiber wiring diagram and also by connecting between the proximity portions. Specifically, the proximity portions are connected to one another in accordance with the calculated optical fiber length. In a real space, there may be a region in which wiring of the optical fiber is impossible; in this case, the wiring data is corrected, when appropriate, using the calculated optical fiber length as a basis. For example, in a case where there is a region in which the optical fiber is not supposed to be installed, such as a space in which no facility exists, between point A and point B, these points are not supposed to be connected by a straight line, and thus the way in which respective branch/intersection points are connected is corrected so that inconsistency does not occur.

Procedure 6

Here, when the path input from the wiring list input unit 11 differs from the path established from the result of estimation by the measurement result analysis unit 16, an edited wiring diagram display unit 19 edits the path input from the wiring list input unit 11 by adding information of a worker input from an on-site information input unit 18, and displays the edited path.

Other Embodiments

Note that the present invention is not limited to the above-described embodiment examples as they stand, and can be embodied by altering the constituent elements without departing from the principles thereof in an implementation stage. Furthermore, various inventions can be formed by combining the plurality of constituent elements disclosed in the above-described embodiment examples as appropriate. For example, some constituent elements may be deleted from all of the constituent elements described in the embodiment examples. Furthermore, the constituent elements included in different embodiment examples may be combined as appropriate.

Advantageous Effects of Invention

As described above, with use of the techniques of the present invention, every route can be established efficiently simply by performing a task at a plurality of points in optical fiber wiring that extends across a large range on the order of kilometers. This can contribute to efficient optical fiber management in various usage scenes of an optical fiber, such as establishment of a route of a communication optical fiber and optical fiber wiring for sensing.

REFERENCE SIGNS LIST

1 Measured optical fiber
2 Optical measurement device
3 Branch portion
4 Parallel portion
5 Loop portion
6 Turn-around portion
7 Intersection portion
11 Wiring list input unit
12 Wiring diagram display unit
13 Cable branch/intersection point display unit
14 Measurement position presentation unit
15 Measured data input unit
16 Measurement result analysis unit
17 Calculated wiring diagram display unit
18 On-site information input unit
19 Edited wiring diagram display unit
G Disturbance

The invention claimed is:

1. An optical fiber route search method that confirms a path of one optical fiber with no optical power division that is arranged in a space so as to include at least one proximity portion in which the optical fiber is in proximity to itself, the optical fiber route search method comprising:

performing optical measurement of inputting test light to the optical fiber while applying a disturbance to multiple positions along the optical fiber, and obtaining a distribution of response light of the test light in a length direction of the optical fiber;

performing a singularity detection of detecting a change in the number of singularities that appear in the distribution of the response light based on a position of the optical fiber in which the disturbance has been applied; and performing a determination of determining that the proximity portion exists in the position of the optical fiber in which the disturbance has been applied when the number of the singularities has changed due to a change in the position of application of the disturbances, and estimating an arranged state of the optical fiber connecting to the proximity portion.

2. The optical fiber route search method according to claim 1, wherein the optical measurement to the determination is performed in a vicinity of a position of the proximity portion stored in a database, and the optical fiber route search method further comprises:

performing a calibration of comparing the position of the proximity portion or an arrangement of the optical fiber determined in the determination with the position of the proximity portion or an arrangement of the optical fiber stored in the database, and calibrating the position of the proximity portion or the arrangement of the optical fiber stored in the database.

3. The optical fiber route search method according to claim 1, wherein in the space, the singularity detection and the determination are performed in sequence, from one end of the optical fiber on which the test light is input in the optical measurement toward a direction away from the one end.

4. An optical fiber route search device that confirms a path of one optical fiber with no optical power division that is arranged in a space so as to include at least one proximity portion in which the optical fiber is in proximity to itself, the optical fiber route search device comprising:

a measured data input unit that input a distribution of response light of the test light in a length direction of the optical fiber, the distribution of response light is obtained by inputting test light to the optical fiber while applying a disturbance to multiple positions along the optical fiber; and a measurement result analysis unit that detects the number of singularities that appear in the distribution of the response light input to the measured data input unit, determines that the proximity portion exists in a position of the optical fiber in which the disturbance has been applied when detecting a change in the number of the singularities due to a change in a position of application of the disturbance, and estimates a status of an arranged state of the optical fiber connecting to the proximity portion.

5. The optical fiber route search device according to claim 4, further comprising:

a wiring list input unit that is input a position of the proximity portion or an arrangement of the optical fiber stored in a database; and a calibrating unit that compares the position of the proximity portion or the arrangement of the optical fiber input to the wiring list input unit with the position of the proximity portion determined by the measurement result analysis unit or the arrangement of the optical fiber estimated by the measurement result analysis unit, and calibrates the position of the proximity portion or the arrangement of the optical fiber input to the wiring list input unit.

6. The optical fiber route search device according to claim 5, further comprising:

a measurement position presentation unit that presents the position applied the disturbance based on the position of the proximity portion or the arrangement of the optical fiber input to the wiring list input unit.

7. A non-transitory computer-readable storage medium storing a program for causing a computer to function as the optical fiber route search device according to claim 4.

* * * * *